(12) United States Patent
Woldemar et al.

(10) Patent No.: US 9,418,697 B2
(45) Date of Patent: Aug. 16, 2016

(54) RADIAL CHANNEL WITH FLUID RESERVOIR

(71) Applicant: SEAGATE TECHNOLOGY LLC, Cupertino, CA (US)

(72) Inventors: Chris M. Woldemar, Santa Cruz, CA (US); Hans Leuthold, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 73 days.

(21) Appl. No.: 14/084,614

(22) Filed: Nov. 19, 2013

(65) Prior Publication Data

US 2015/0139574 A1    May 21, 2015

(51) Int. Cl.
*G11B 19/20* (2006.01)
*F16C 33/10* (2006.01)
*F16C 17/04* (2006.01)

(52) U.S. Cl.
CPC ........ *G11B 19/2036* (2013.01); *F16C 33/1045* (2013.01); *F16C 33/1065* (2013.01); *F16C 17/045* (2013.01); *F16C 33/107* (2013.01); *F16C 33/1085* (2013.01); *F16C 2370/12* (2013.01)

(58) Field of Classification Search
CPC ........ F16C 17/00; F16C 17/026; F16C 17/04; F16C 17/045; F16C 17/10; F16C 17/102; F16C 17/107; F16C 33/745; F16C 2370/12; F16C 33/1045; F16C 33/107; F16C 33/1085; G11B 19/2036
See application file for complete search history.

(56) References Cited

U.S. PATENT DOCUMENTS

| | | | |
|---|---|---|---|
| 6,154,339 A | 11/2000 | Grantz et al. | |
| 6,181,039 B1 | 1/2001 | Kennedy et al. | |
| 6,655,841 B1 | 12/2003 | Heine et al. | |
| 6,955,471 B2 | 10/2005 | Heine et al. | |
| 7,825,557 B2 * | 11/2010 | Drautz et al. | 310/90 |
| 7,980,764 B2 * | 7/2011 | Gredinberg et al. | 384/107 |
| 7,982,349 B2 * | 7/2011 | Popov et al. | 310/90 |
| 8,277,126 B2 * | 10/2012 | Hori et al. | 384/107 |
| 8,454,239 B2 * | 6/2013 | Bitou et al. | 384/107 |
| 8,502,429 B2 * | 8/2013 | Jang et al. | 310/90 |
| 8,562,222 B2 * | 10/2013 | LeBlanc et al. | 384/130 |
| 8,616,771 B2 * | 12/2013 | Niwa | 384/100 |
| 8,702,310 B2 * | 4/2014 | Han et al. | 384/107 |
| 8,876,385 B2 * | 11/2014 | Harada et al. | 384/107 |
| 8,979,374 B2 * | 3/2015 | Konno et al. | 384/107 |
| 2011/0101807 A1 * | 5/2011 | Yu | 310/90 |
| 2011/0123139 A1 * | 5/2011 | Kimura et al. | 384/107 |
| 2011/0255393 A1 * | 10/2011 | Oh et al. | 369/215.1 |
| 2012/0013213 A1 * | 1/2012 | Kim | 310/90 |
| 2012/0043842 A1 * | 2/2012 | Choi | 310/90 |
| 2012/0049676 A1 * | 3/2012 | Lee et al. | 310/90 |
| 2012/0112587 A1 * | 5/2012 | Kim | 310/90 |
| 2012/0187789 A1 * | 7/2012 | Noh et al. | 310/90 |
| 2012/0217832 A1 * | 8/2012 | Kim et al. | 310/90 |

(Continued)

*Primary Examiner* — Alan B Waits

(57) ABSTRACT

Provided is an apparatus, including a stationary component; a rotatable component, wherein the stationary component and the rotatable component are positioned for relative rotation; a first sealing means positioned in a radial channel at a first axial end of the rotatable component; a second sealing means positioned in an axial channel at a second axial end of the rotatable component; and a fluid reservoir adjacent to the first sealing means and extending radially outward from the first sealing means, wherein the fluid reservoir is positioned radially outward from the pump seal, and wherein the fluid reservoir extends radially outward from the pump seal.

20 Claims, 4 Drawing Sheets

(56) References Cited

U.S. PATENT DOCUMENTS

| | | | |
|---|---|---|---|
| 2013/0033137 A1* | 2/2013 | Yu | 310/90 |
| 2013/0076179 A1* | 3/2013 | Lee | 310/90 |
| 2013/0129268 A1* | 5/2013 | Cheong et al. | 384/107 |
| 2013/0182979 A1* | 7/2013 | Ito et al. | 384/107 |
| 2013/0321946 A1* | 12/2013 | Kimura et al. | 360/71 |
| 2014/0036391 A1* | 2/2014 | Kodama et al. | 360/99.08 |
| 2014/0147065 A1* | 5/2014 | Sugiki | 384/107 |
| 2014/0368951 A1* | 12/2014 | Lee et al. | 360/99.08 |

\* cited by examiner

RADIAL CHANNEL WITH FLUID RESERVOIR

BACKGROUND

Hard disk drives ("HDDs") may have exacting height constraints that limit the axial space in designs including fluid dynamic bearing ("FDB") motors. The limited axial space in such designs may provide FDB motors with insufficient journal bearing span, leading to reduced angular stiffness. Because angular stiffness is the mathematical product of linear stiffness (e.g., radial stiffness in the journal bearing and axial stiffness in the thrust bearing) and moment arm length (e.g., journal bearing span and thrust bearing diameter), larger diameter thrust bearings may increase the moment arm length, thereby increasing angular stiffness in cases where it is difficult to increase journal bearing span. However, larger diameter thrust bearings consume more power, leading to less power efficiency.

SUMMARY

Provided is an apparatus, including a stationary component; a rotatable component, wherein the stationary component and the rotatable component are positioned for relative rotation; a first sealing means positioned in a radial channel at a first axial end of the rotatable component; a second sealing means positioned in an axial channel at a second axial end of the rotatable component; and a fluid reservoir adjacent to the first sealing means and extending radially outward from the first sealing means, wherein the fluid reservoir is positioned radially outward from the pump seal, and wherein the fluid reservoir extends radially outward from the pump seal.

These and other features and aspects may be better understood with reference to the following drawings, description, and appended claims.

DRAWINGS

Figure 1A:
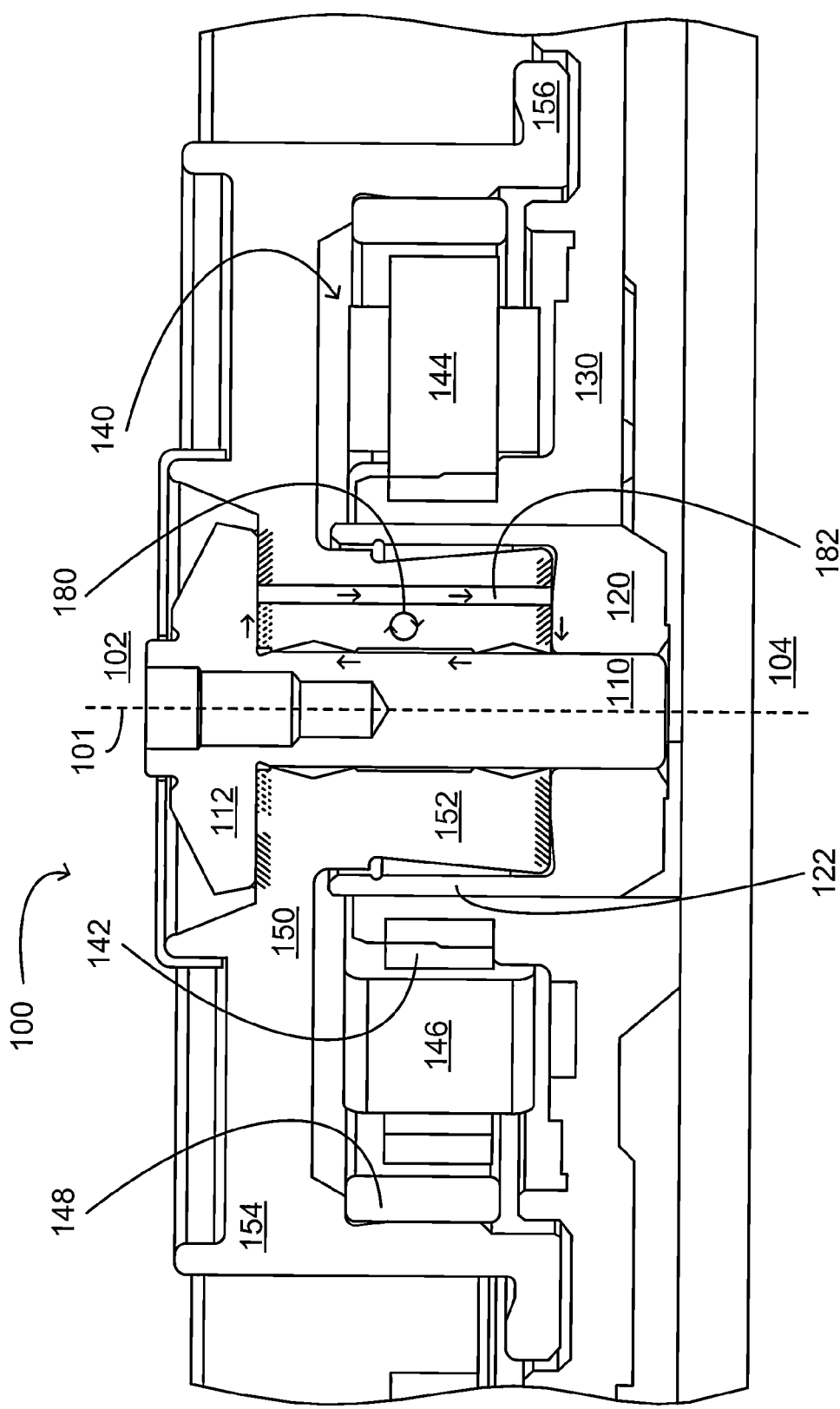

FIG. 1A provides a cross-sectional view of an FDB motor including a parallel recirculation channel, in accordance with an embodiment.

Figure 1B:
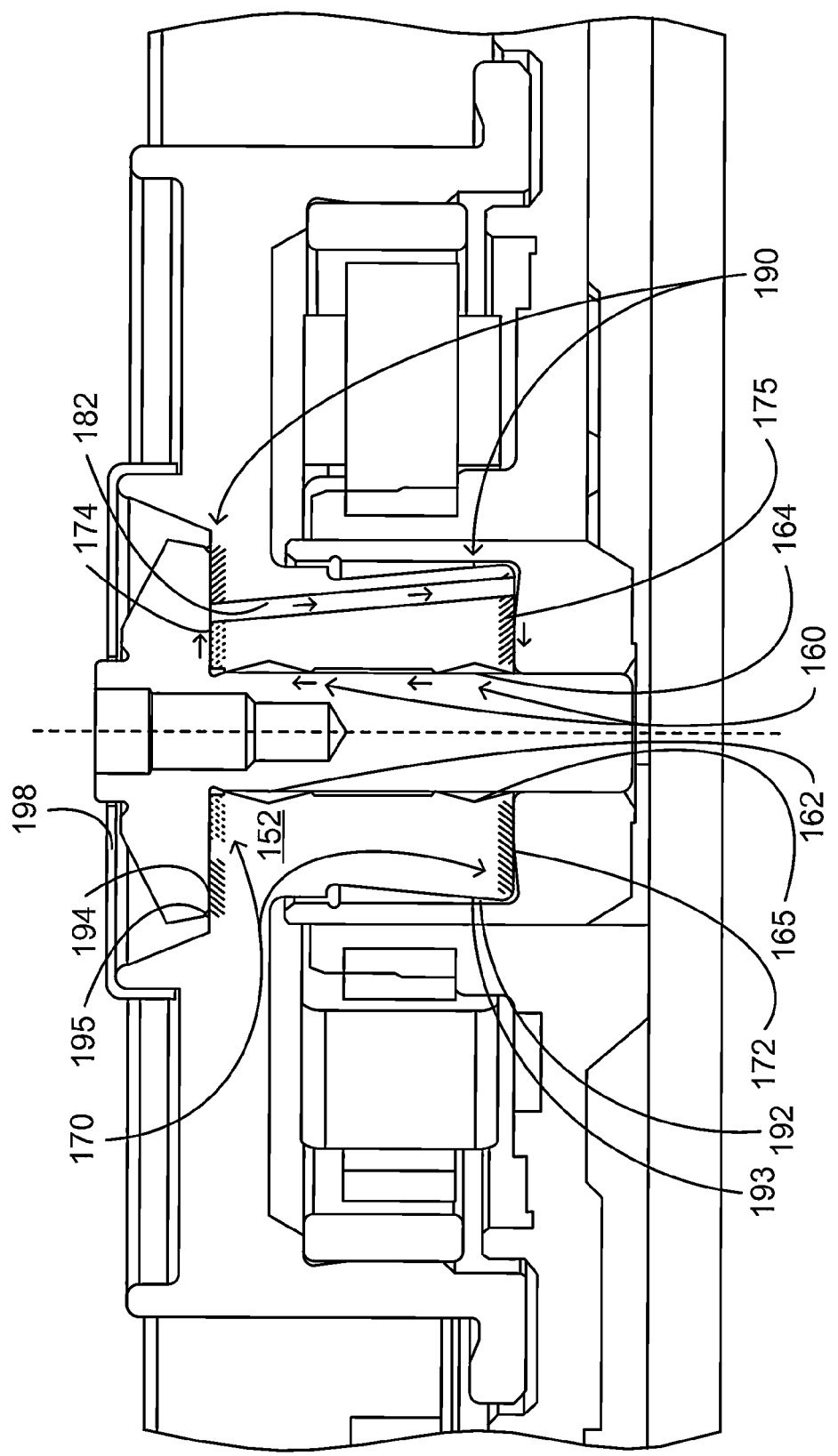

FIG. 1B provides a cross-sectional view of an FDB motor including an angled recirculation channel, in accordance with an embodiment.

Figure 2A:
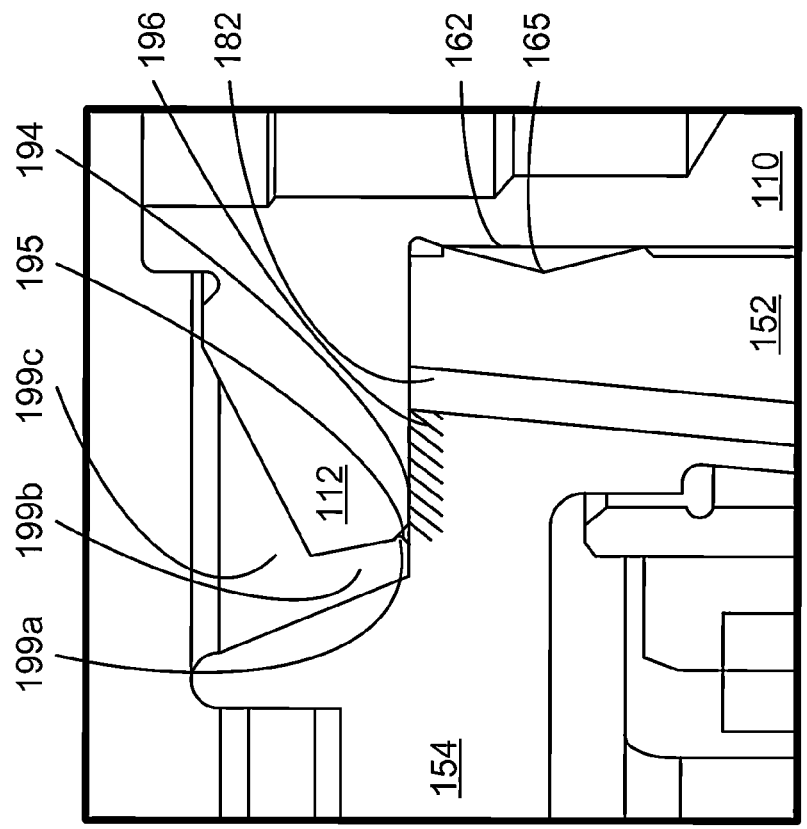

FIG. 2A provides a close-up, cross-sectional view of the FDB motor in FIG. 1A with an upper thrust bearing, in accordance with an embodiment.

Figure 2B:
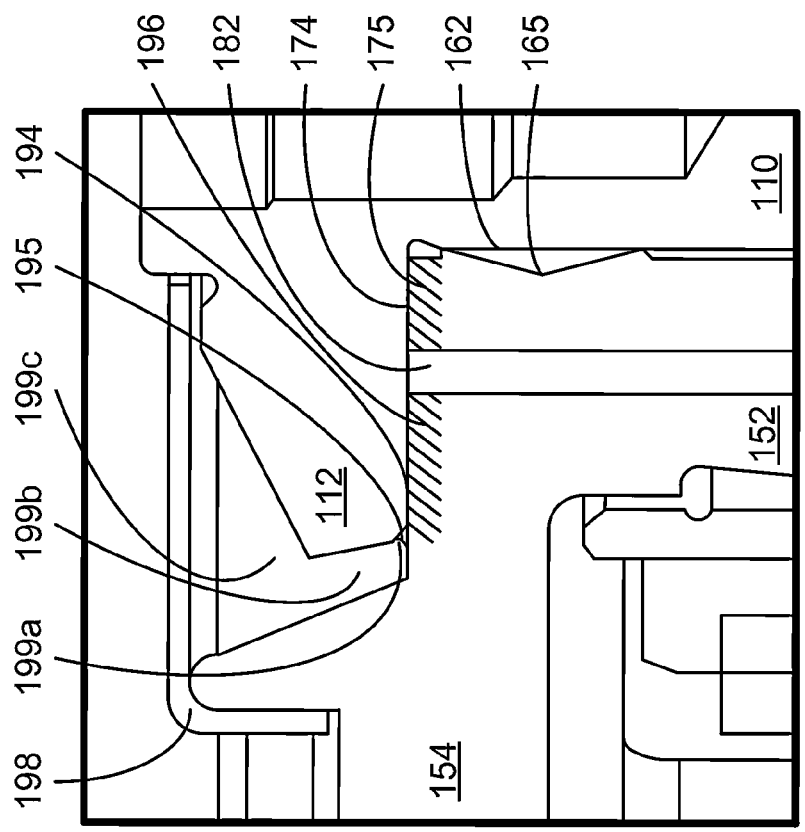

FIG. 2B provides a close-up, cross-sectional view of the FDB motor in FIG. 1B without an upper thrust bearing or an end cap, in accordance with an embodiment.

Figure 3:
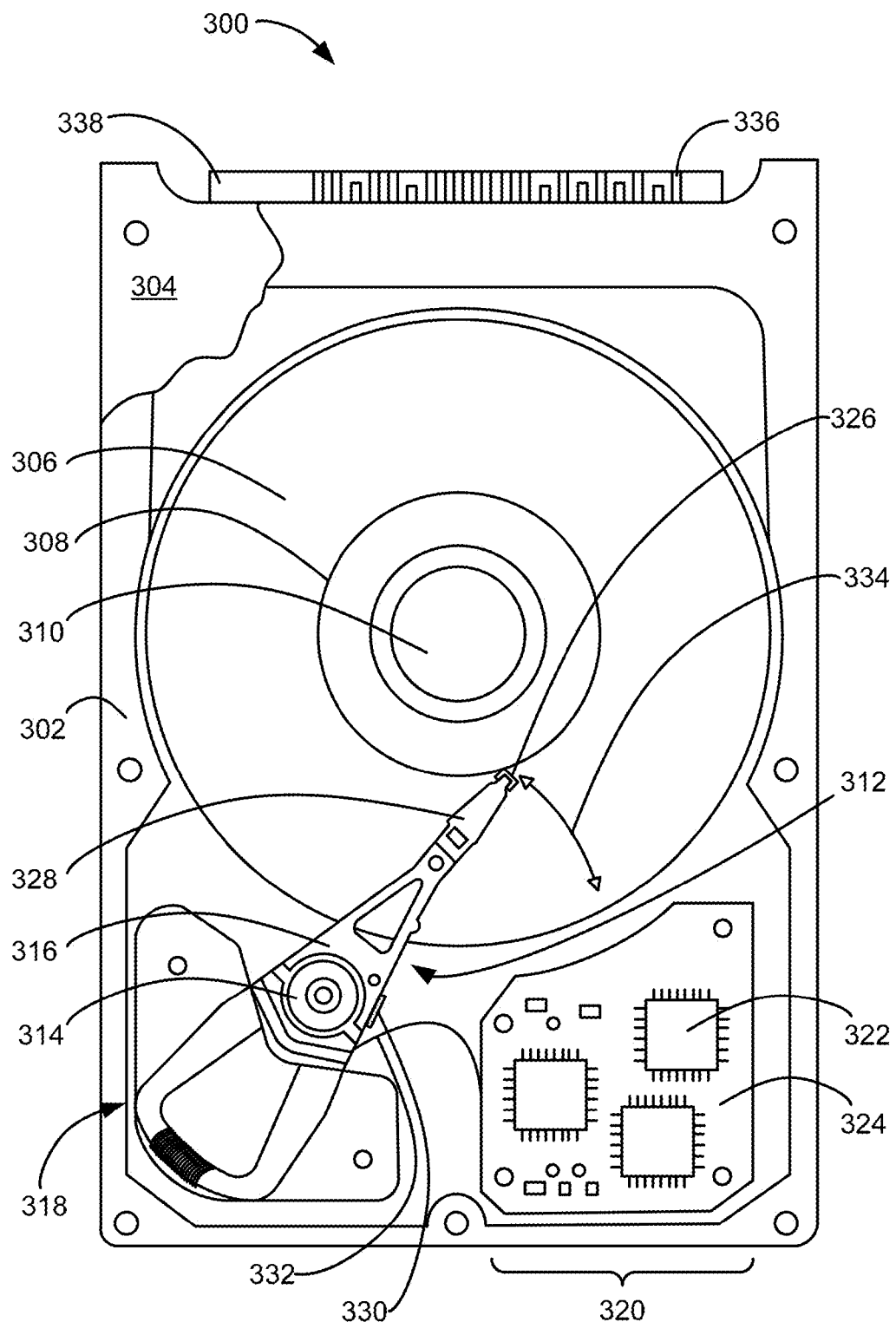

FIG. 3 provides is a plan view of a data storage device in which an FDB motor may be used, in accordance with an embodiment.

DESCRIPTION

Before some embodiments are described in greater detail, it should be understood by persons having ordinary skill in the art that the particular embodiments described and/or illustrated herein are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing some embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation. For example, "first," "second," and "third" elements or steps need not necessarily appear in that order, and embodiments need not necessarily be limited to the three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It should also be understood by persons having ordinary skill in the art that any two-dimensional terminology used herein for describing features of FDB motors in relation to the cross-sectional views of FDB motors provided in FIGS. 1A, 1B, 2A, and 2B may be extended to three-dimensional terminology. For example, a feature of an FDB motor provided in FIGS. 1A, 1B, 2A, and 2B and described as a radial channel, which may be considered two-dimensional terminology, may be described in three-dimensional terminology as an annular channel or annular space, as the radial channel becomes an annular channel or annular space when viewed as a volume of revolution about a centerline axis of the FDB motor. In another example, a feature of an FDB motor provided in FIGS. 1A, 1B, 2A, and 2B and described as a axial channel, which may be considered two-dimensional terminology, may be described in three-dimensional terminology as an cylindrical channel or cylindrical space, as the axial channel becomes a cylindrical channel or cylindrical space when viewed as a volume of revolution about the centerline axis of the FDB motor.

Unless defined otherwise, all technical and scientific terms used herein have the same meaning as commonly understood by persons of ordinary skill in the art.

HDDs may have exacting height constraints that limit the axial space in designs including FDB motors. The limited axial space in such designs may provide FDB motors with insufficient journal bearing span, leading to reduced angular stiffness. Larger diameter thrust bearings may increase the moment arm length component of angular stiffness, thereby increasing angular stiffness in cases where it is difficult to increase journal bearing span. However, larger diameter thrust bearings consume more power, leading to less power efficiency. Journal bearings with increased journal bearing span and typically smaller diameters than thrust bearings may increase the moment arm length component of angular stiffness, thereby increasing angular stiffness without negatively affecting power efficiency. Provided herein are FDB motors that improve angular stiffness by incorporating a pump seal in a radial channel, thereby allowing for an increase in journal bearing span without significantly affecting power efficiency.

FIGS. 1A and 1B provide cross-sectional views of FDB motors including a pump seal in a radial channel, thereby allowing for an increase in journal bearing span without significantly affecting power efficiency. However, it should be understood that the particular embodiments provided in FIGS. 1A and 1B, as FIGS. 1A and 1B are merely examples of FDB motors including a pump seal in a radial channel, and the particular embodiments are not limiting.

The FDB motor 100 in either one of FIG. 1A or FIG. 1B includes a stationary component and a rotatable component positioned for relative rotation about a bearing system. With respect to the stationary component, the stationary component may include a shaft 110 extending from a first axial end 102 of the FDB motor 100 (see shaft head 112) to a second axial end 104 of the FDB motor 100, through which shaft 110 passes a centerline axis 101 of the FDB motor 100. The shaft 110 may be coupled to a cup 120 at the second axial end 104 of the FDB motor 100, which cup 120, in turn, may be coupled to a base 130 through a wall 122 of the cup 120. The stationary component may further include a stator assembly 140 coupled to the base 130, which stator assembly 140 may include yoke 142, a plurality of stator teeth 144, and a plurality of field coils 146 singly disposed on the plurality of stator teeth 144. Adhesive bonds may be used to couple the foregoing coupled components, but coupling may also be accomplished with epoxy, welds, or fasteners, as desired. One or more sub-components (e.g., shaft 110) of the stationary component may be coupled to a housing for the FDB motor 100, or a housing component (e.g., top cover), which may significantly improve structural stiffness of the system while compromising little in axial space.

With respect to the rotatable component of the FDB motor 100 in either one of FIG. 1A or FIG. 1B, the rotatable component may include a sleeve-hub assembly 150 having a sleeve 152 sub-component coupled to a hub 154 sub-component. As shown, the sleeve-hub assembly 150 may be an integral sleeve-hub assembly 150 having a sleeve 152 portion and a hub 154 portion. The sleeve 152 of the sleeve-hub assembly 150 may be rotatably fitted within the cup 120 such that the cup wall 122 of the cup 120 extends over a substantial axial length of the sleeve 152, including over at least 20%, 30%, 40%, 50%, 60%, 70%, or 80% of the axial length of the sleeve 152, which may function to minimize angular displacement of the sleeve-hub assembly. The sleeve 152 may include a cylindrical bore through its center in which the shaft 110 may be fitted. The hub 154 of the sleeve-hub assembly 150 may include a hub flange 156 configured to support one or more disks (e.g., magnetic recording media) of a disk pack for rotation. The hub 154 may further include a back iron or magnet 148 coupled to the hub 154, which back iron or magnet 148 cooperates with the stator assembly 140 to induce rotation of the hub 154 and the disk pack. Adhesive bonds may be used to couple the foregoing coupled components, but coupling may also be accomplished with epoxy, welds, or fasteners, as desired.

With respect to the bearing system of the FDB motor 100 in either one of FIG. 1A or FIG. 1B, the bearing system may include a lubricating fluid (e.g., lubricating oil) and one or more FDBs selected from journal bearings and thrust bearings. As for journal bearings, the FDB motor 100 may include a journal bearing system 160 positioned in an axial channel between the shaft 110 and the sleeve 152, which axial channel may extend from a top portion of the sleeve 152 near the first axial end 102 of the FDB motor 100 to a bottom portion of the sleeve 152 near the second axial end 104 of the FDB motor 100. The journal bearing system 160 may include an upper journal bearing 162 and a lower journal bearing 164 axially separated by a radial gap (not labeled), which radial gap may function as a reservoir for some of the lubricating fluid. As shown in either one of FIG. 1A or FIG. 1B, the upper journal bearing 162 and the lower journal bearing 164 may each include pressure-generating grooves 165 (e.g., chevron-shaped grooves) for creating localized regions of pressure in the journal bearing system 160. Such pressure-generating grooves 165 may be positioned in a surface of the shaft 110 or a surface of the sleeve 152, and the upper journal bearing 162 and the lower journal bearing 164 may be the same or different with respect to the surface in which the pressure-generating grooves 165 are positioned. A person having ordinary skill in the art will recognize that pressure-generating grooves 165 are representations of pressure-generating grooves configured for creating localized regions of pressure in the journal bearing system 160.

As for thrust bearings, the bearing system of the FDB motor 100 in either one of FIG. 1A or FIG. 1B may include a thrust bearing system 170 positioned in one or more radial channels. The thrust bearing system 170 may include at least a lower thrust bearing 172 positioned in a radial channel between the sleeve 152 and the cup 120, which radial channel may extend from an inner radius of the FDB motor 100 near the shaft 110 to an outer radius of the FDB motor 100 near the wall 122 of the cup 120. A thrust bearing system 170 including a single, lower thrust bearing 172 may be used in an FDB motor 100 including a magnetically biased hub, wherein the magnetically biased hub's attraction to the base 130 is balanced by the lift of the single, lower thrust bearing 172. The thrust bearing system 170 may further include an upper thrust bearing 174 positioned in a radial channel between the sleeve 152 and the shaft head 112, which radial channel may extend from an inner radius of the FDB motor 100 near the shaft 110 to an outer radius of the FDB motor 100 near an outer radius of the shaft head 112. (See FIG. 2A for an example of an FDB motor 100 with an upper thrust bearing 174, and see FIG. 2B for an example of an FDB motor 100 without an upper thrust bearing.) The thrust bearing 174 may be further positioned in a portion of the foregoing radial channel, which portion of the radial channel may extend from an inner radius of the FDB motor 100 near the shaft 110 to an outer radius of the FDB motor 100 near a recirculation channel 182, wherein opposing surfaces (e.g., thrust surface and counter surface of thrust bearing 174) of the portion of the radial channel are parallel or about parallel. A thrust bearing system 170 including dual thrust bearings such as lower thrust bearing 172 and upper thrust bearing 174 may be used in an FDB motor 100 without a magnetically biased hub, as the downward force (e.g., toward base 130) provided by the upper thrust bearing 174 is balanced by the lift provided by lower thrust bearing 172. As shown in either one of FIG. 1A or FIG. 1B, the lower thrust bearing 172 and the upper thrust bearing 174 (if present, as in FIG. 2A) may each include pressure-generating grooves 175 (e.g., chevron-shaped grooves; spiral-shaped grooves; etc.) for creating localized regions of pressure in the thrust bearing system 170. Such pressure-generating grooves 175 may be positioned in a surface of the sleeve 152 or in an opposing surface such as an opposing surface of the cup 120 or an opposing surface of the shaft head 112. The lower thrust bearing 172 and the upper thrust bearing 174 may be the same or different with respect to the surface in which the pressure-generating grooves are positioned. A person having ordinary skill in the art will recognize that pressure-generating grooves 175 are representations of pressure-generating grooves configured for creating localized regions of pressure in the thrust bearing system 170.

The FDB motor 100 in either one of FIG. 1A or FIG. 1B further includes a recirculation system 180 for the lubricating fluid (e.g., lubricating oil), wherein the recirculation system 180 is primarily positioned between the stationary component and the rotatable component, and wherein the recirculation system 180 includes the bearing system (e.g., journal bearing system 160 and thrust bearing system 170) and a fluid circuit. The fluid circuit includes a recirculation channel 182 and the channels in which the bearing system is positioned, including the axial channel in which the journal bearing system 160 positioned and the radial channels in which the thrust bearing system 170 is positioned. Flow through the fluid circuit is denoted in FIGS. 1A and 1B by a clockwise-oriented group of arrows. The recirculation channel 182 of the fluid circuit may be formed within the rotatable component such as through the sleeve 152 in a number of different configurations, including the configurations shown in each of FIGS. 1A and 1B. As shown in FIG. 1A, the recirculation channel 182 may be configured such that the recirculation channel 182 is parallel to the shaft 110 and/or centerline axis 101. In such a configuration, the recirculation channel 182 near the first axial end 102 of the FDB motor 100 and the recirculation channel 182 near the second axial end 104 of the FDB motor 100 are at equal radial distances from the shaft 110 and/or centerline axis 101. As shown in FIG. 1B, the recirculation channel 182 may be configured such that the recirculation channel 182 is angled or not parallel to the shaft 110 and/or centerline axis 101. In such a configuration, the recirculation channel 182 near the first axial end 102 of the FDB motor 100 may be at an inner radius and the recirculation channel 182 near the second axial end 104 of the FDB motor 100 may be at an outer radius, wherein the inner radius and the outer radius represent relative radial distances from the shaft 110 and/or centerline axis 101.

The FDB motor 100 in either one of FIG. 1A or FIG. 1B further includes a sealing system 190 positioned outside the fluid circuit (e.g., radially outward from the fluid circuit) of the recirculation system 180 for sealing the lubricating fluid (e.g., lubricating oil) within the FDB motor 100, which includes containing the lubricating fluid within the recirculation system and/or maintaining lubricating fluid in the bearing system (e.g., journal bearing system 160 and thrust bearing system 170), such as maintaining lubricating fluid at the interfaces of the journal bearings and the thrust bearing(s). The sealing system 190 may include a capillary seal 192 and a pump seal 194, which capillary seal 192 and pump seal 194 work in concert to seal the lubricating fluid within the FDB motor 100, and which capillary seal 192 and pump seal 194 are in equilibrium during relative rotation of the stationary component and the rotatable component or at rest. Each of the capillary seal 192 and the pump seal 194 includes a meniscus defining an air-lubricating fluid interface (e.g. air-oil interface), wherein the meniscus 193 corresponds to the meniscus of the capillary seal 192, and wherein the meniscus 195 corresponds to the meniscus of the pump seal 194. The meniscus 193 of the capillary seal 192 and the meniscus 195 of the pump seal 194 balance out when the FDB motor 100 is at rest, such that the surface tension and/or the surface curvature of the meniscus 193 of the capillary seal 192 and the meniscus 195 of the pump seal 194 match or nearly match. The meniscus 193 of the capillary seal 192 and the meniscus 195 of the pump seal 194 balance out during relative rotation of the stationary component and the rotatable component, such that lubricating fluid empties out of the pump seal 194 and into the recirculation system 180 as the FDB motor 100 spins up. Concurrent with the lubricating fluid emptying out of the pump seal 194, lubricating fluid fills an axially diverging gap or a reservoir of the capillary seal 192 moving the meniscus 193 toward the first axial end 102 of the FDB motor 100. As illustrated in either one of FIG. 1A or 1B, the sealing system 190 may further include an end cap 198 to further seal the lubricating fluid within the FDB motor 100. The end cap 198 may function as secondary containment for the lubricating fluid, and/or the end cap 198 may function as a barrier to keep the lubricating fluid free from outside debris.

With respect to the capillary seal 192 of the FDB motor 100, the capillary seal 192 may be configured to provide a low stiffness seal, a low pressure seal, and/or a high volume seal relative to the pump seal 194. As provided in either one of FIG. 1A or FIG. 1B, the capillary seal may be positioned in an axial channel between the sleeve 152 and the wall 122 of the cup 120, which axial channel extends from a bottom of the rotatable component near the second axial end 104 of the FDB motor 100 and opens toward the first axial end 102 of the FDB motor 100. As illustrated in either one of FIG. 1A or 1B, the axial channel in which the capillary seal 192 is positioned includes a diverging gap. The diverging gap in which the capillary seal 192 is positioned may be configured to draw lubricating fluid into the gap by capillary action toward the second axial end 104 of the FDB motor 100 where the diverging gap is tighter. The axially diverging gap in which the capillary seal 192 is positioned may be further configured to purge air bubbles entrained in the lubricating fluid (e.g., lubricating oil).

With respect to the pump seal 194 of the FDB motor 100, the pump seal 194 may be configured to provide a high stiffness seal, a high pressure seal, and/or a low volume seal relative to the capillary seal 192. As provided in FIGS. 1A, 1B, 2A, and 2B, the pump seal 194 may be positioned in a radial channel between the sleeve 152 and the shaft head 112, which radial channel may extend from an inner radius of the FDB motor 100 near the shaft 110 to an outer radius of the FDB motor 100 near the outer radius of the shaft head 112. The pump seal 194 may be further positioned in a portion of the foregoing radial channel, which portion of the radial channel may extend from an inner radius of the FDB motor 100 near the recirculation channel 182 to an outer radius of the FDB motor 100 near the outer radius of the shaft head 112, wherein opposing surfaces of the portion of the radial channel are parallel or about parallel. As shown in FIGS. 1A, 1B, 2A, and 2B, the pump seal 194 may include pumping grooves 196 for pumping lubricating fluid (e.g., lubricating oil) into the FDB motor 100, such as for pumping lubricating fluid into the recirculation system 180. Such pumping grooves 196 may be positioned in a surface of the sleeve 152 and may have any of a number of configurations with respect to radial length, depth, groove-to-pitch ratio ("GPR"), and/or angle. A person having ordinary skill in the art will recognize that pumping grooves 196 are representations of pumping grooves configured for pumping lubricating fluid into the FDB motor 100, such as for pumping lubricating fluid into the recirculation system 180.

Incorporating a pump seal in a radial channel (e.g., the pump seal 194 in the radial channel near the first axial end 102 of the FDB motor 100 as provided in FIGS. 1A, 1B, 2A, and 2B) instead of in an axial channel provides an FDB motor with a robust sealing system and axial space into which a journal bearing system may be expanded. An increase in bearing span for any one or more journal bearings in the journal bearing system provides an increase in angular stiffness for the FDB motor as angular stiffness is the mathematical product of linear stiffness (i.e., radial stiffness in the journal bearing(s) and axial stiffness in the thrust bearing(s)) and moment arm length (i.e., journal bearing span and thrust bearing diameter). Because angular stiffness of the FDB motor may be increased with the increase in bearing span for any one or more journal bearings of the journal bearing system, one or more larger diameter thrust bearings are not needed for the increase in angular stiffness for the FDB motor, which one or more larger diameter thrust bearings are known to decrease power efficiency of the FDB motor. As such, incorporating a pump seal in a radial channel instead of in an axial channel provides an FDB motor with a robust sealing system and a means for increasing angular stiffness of the FDB motor without decreasing the power efficiency of the FDB motor. It should be understood that it may be desirable in some FDB motors (e.g., FDB motors in HDDs having small form factors) to further increase angular stiffness using one or more larger diameter thrust bearings, wherein the further increase in angular stiffness may be in addition to increasing the bearing span for one or more journal bearings. While the further increase in angular stiffness using one or more larger diameter thrust bearings may decrease the power efficiency of the FDB motor, the decrease in power efficiency may be less than that for the same gain in angular stiffness using one or more larger diameter thrust bearings alone.

An increase in bearing span for any one or more journal bearings in the journal bearing system may alter the pivot point position in the journal bearing system, which pivot point position is important to match as closely as possible to the center of gravity of the one or more disks (e.g., magnetic recording media) of the disk pack in order to avoid precession or wobbling of the rotatable component about the stationary component during relative rotation of the stationary component and the rotatable component. In a journal bearing system including two journal bearings such as upper journal bearing 162 and lower journal bearing 164 of FDB motor 100 in FIGS. 1A and 1B, the pivot point position of the journal bearing system 160 may be considered a balance of moments or a proportionality between a strength factor (k) and a lever arm length (l) for each of the two journal bearings:

$$k_1 l_1 = k_2 l_2$$

Upper journal bearing 162 and lower journal bearing 164, for example, may be equal in length and in strength placing the pivot point position of the journal bearing system 160 at the geometric center between the upper journal bearing 162 and the lower journal bearing 164. However, an increase in length (e.g., lever arm length $l_1$) concurrent with an increase in strength (e.g., strength factor $k_1$) for either one of the upper journal bearing 162 or the lower journal bearing 164 effectively results in a decrease in length (e.g., lever arm length $l_2$) for the other journal bearing such that the balance of moments is conserved, which moves the pivot point position to the place at which $l_1$ and $l_2$ meet. In another example, the upper journal bearing 162 may be longer than the lower journal bearing 164 placing the pivot point position of the journal bearing system 160 below the geometric center between the upper journal bearing 162 and the lower journal bearing 164 or toward the second axial end 104 of the FDB motor 100 in FIGS. 1A and 1B. In such an example, the lower journal bearing 164 may be stronger than the upper journal bearing 162 in accordance with the foregoing proportionality. In yet another example, the lower journal bearing 164 may be longer than the upper journal bearing 162 placing the pivot point position of the journal bearing system 160 above the geometric center between the upper journal bearing 162 and the lower journal bearing 164 or toward the first axial end 102 of the FDB motor 100 in FIGS. 1A and 1B. In such an example, the upper journal bearing 162 may be stronger than the lower journal bearing 164 in accordance with the foregoing proportionality. Depending upon the disk pack configuration (e.g., number and arrangement of disks), it may be desirable to utilize recaptured axial space (e.g., axial space recaptured by incorporating a pump seal in a radial channel instead of in an axial channel) to push the pivot point position of the journal bearing system toward one axial end of the FDB motor, which includes increasing the length of a journal bearing (or the strength of a journal bearing) at the one axial end of the FDB motor. In the FDB motor 100 in FIGS. 1A and 1B, for example, the recaptured axial space may be used to increase the length of the lower journal bearing 164 (and the strength of the upper journal bearing 162) to push the pivot point position of the journal bearing system 160 toward the first axial end 102 of the FDB motor 100 to match the center of gravity of the disk pack.

Matching the pivot point position in the journal bearing system to the center of gravity of the disk pack, or minimizing the mismatch between the pivot point position in the journal bearing system to the center of gravity of the disk pack, is important for in-situ servo track writing, the accuracy of which may heavily rely on angular stiffness of the FDB motor. In in-situ servo track writing, servo tracks (i.e., magnetic patterns recorded onto disks of the disk pack for proper positioning of a read-write head within a track for data read-write operations) may be propagated from a disk of the disk pack including pre-written servo tracks to other disks of a disk pack, for example, after HDD assembly. Precession or wobbling of the rotatable component about the stationary component during relative rotation of the stationary component and the rotatable component due to a mismatch between the pivot point position in the journal bearing system to the center of gravity of the disk pack may introduce errors in the servo tracks propagated from the disk of the disk pack including pre-written servo tracks to other disks of a disk pack. For example, in in-situ servo track writing, a HDD may include a five-disk disk pack, wherein the third disk or middle disk contains pre-written servo tracks for guiding servo track writing on the other disks of the disk pack. Precession or wobbling of the sleeve-hub assembly onto which the five-disk disk pack is mounted may introduce aberrational movement with respect to the other disks of the disk pack and their respective read-write heads, which aberrational movement may introduce errors in the servo tracks propagated from the third disk or middle disk to the other disks of a disk pack. Because the aberrational movement may be greatest between the top and bottom disks of the five-disk disk pack and their respective read-write heads, the errors introduced in the servo tracks of the top and bottom disks may also be greatest of any errors. In view of the foregoing, in incorporating a pump seal in a radial channel and increasing the journal bearing span of one or more journal bearings in a journal bearing system, it is important to further match the pivot point position in the journal bearing system to the center of gravity of the disk pack to minimize precession or wobbling, particularly for in-situ servo track writing.

As illustrated in FIGS. 1A and 1B, and as further illustrated in FIGS. 2A and 2B, the radial channel in which the pump seal 194 is positioned includes a diverging gap 199, which diverging gap 199 may include three sections, including chamfer section 199a, diverging gap section 199b, and diverging gap section 199c. It is understood that the chamfer section 199a is a radially diverging gap section, and the diverging gap section 199b is an axially diverging gap section radially outside of the radially diverging cap chamfer section 199a. The diverging gap 199 or a combination of one or more sections 199a-c may be configured to passively purge air bubbles entrained in the lubricating fluid (e.g., lubricating oil) and/or provide a reservoir for lubricating fluid, for example, during a lubricating fluid-filling operation during assembly of the FDB motor 100.

As illustrated in FIGS. 2A and 2B, the reservoir may be established in at least chamfer section 199a, which chamfer section 199a may be radially outward from the pump seal 194, and which chamfer section 199a shares a first face with the sleeve 152 of the sleeve-hub assembly 150 and a second, oblique face with the shaft head 112, such that the distance between the first face (e.g., face of the sleeve 152) and the second face (e.g., face of the shaft head 112) lessens as the fluid reservoir deepens (e.g., in a direction toward centerline axis 101). The chamfer section 199*a* may be positioned outside the fluid circuit (e.g., radially outward from the fluid circuit) of the recirculation system 180 such as fluidly adjoined to the fluid circuit. During relative rotation of the stationary component and the rotatable component, lubricating fluid in the chamfer section 199*a* empties out of the chamfer section 199*a* or substantially empties out of the chamfer section 199*a* into the fluid circuit of the recirculation system 180 through the pump seal 194.

As further illustrated in FIGS. 2A and 2B, the reservoir may be further established in at least chamfer section 199*a* and diverging gap section 199*b*, which chamfer section 199*a* is described herein, and which diverging gap section 199*b* shares a first, oblique face with the hub 154 of the sleeve-hub assembly 150 and a second, optionally oblique, face with the shaft head 112, such that the distance between the first face (e.g., face of the hub 154) and the second face (e.g., face of the shaft head 112) lessens as the fluid reservoir deepens (e.g., in a direction toward the second axial end 104 of the FDB motor 100). The diverging gap section 199*b* may be positioned outside the chamfer section 199*a* such as fluidly adjoined to the chamfer section 199*a*, or a portion of the diverging gap section 199*b* may overlap with a portion of the chamfer section 199*a*. During relative rotation of the stationary component and the rotatable component, lubricating fluid in chamfer section 199*a* and diverging gap section 199*b* empties out of the chamfer section 199*a* and diverging gap section 199*b* or substantially empties out of the chamfer section 199*a* and diverging gap section 199*b* into the fluid circuit of the recirculation system 180 through the pump seal 194.

As further illustrated in FIGS. 2A and 2B, the reservoir may be further established in at least chamfer section 199*a* and diverging gap sections 199*b* and 199*c*, which chamfer section 199*a* and diverging gap section 199*b* is described herein, and which diverging gap section 199*c* shares a first, oblique face with the hub 154 of the sleeve-hub assembly 150 and a second, optionally oblique, face with the shaft head 112, such that the distance between the first face (e.g., face of the hub 154) and the second face (e.g., face of the shaft head 112) lessens as the fluid reservoir deepens (e.g., in a direction toward the second axial end 104 of the FDB motor 100). The diverging gap section 199*c* may be positioned outside the diverging gap section 199*b* such as fluidly adjoined to the diverging gap section 199*b*, or a portion of the diverging gap section 199*c* may overlap with a portion of the diverging gap section 199*b*. During relative rotation of the stationary component and the rotatable component, lubricating fluid in chamfer section 199*a* and diverging gap sections 199*b* and 199*c* empties out of the chamfer section 199*a* and the diverging gap sections 199*b* and 199*c* or substantially empties out of the chamfer section 199*a* and the diverging gap sections 199*b* and 199*c* into the fluid circuit of the recirculation system 180 through the pump seal 194.

The orientation and placement of the reservoir may allow the reservoir to be filled with lubricating fluid (e.g., lubricating oil) using a dispenser for the lubricating fluid during assembly of an FDB motor, such as the FDB motor 100 of FIG. 2B, in which the end cap 198 has yet to be coupled to the FDB motor 100. The reservoir may be filled with a predetermined amount (e.g., moles or mass) of the lubricating fluid using the dispenser under ambient (e.g., standard ambient temperature and pressure) conditions or under sub-ambient (e.g., standard temperature and below standard pressure; below standard temperature and below standard pressure; etc.) conditions. Under ambient conditions, the predetermined amount of the lubricating fluid may be dispensed through, for example, a high-precision, pneumatically controlled syringe. Under sub-ambient conditions (e.g., at least partial vacuum), the predetermined amount of the lubricating fluid may be dispensed through, for example, a microdispenser such as a MicroDrop® microdispenser, which may provide droplets of the lubricating fluid ranging from 30 µm to 100 µm in size. The MicroDrop® microdispenser may further provide droplets of the lubricating fluid at a velocity of 1.5 m/s to 3 m/s, or more, allowing the lubricating fluid to be dispensed from a distance, rather than inserting, for example, a syringe needle into the reservoir of the FDB motor 100 of FIG. 2B. The predetermined amount of the lubricating fluid dispensed into the reservoir may work into various channels or passageways of the FDB motor 100.

In addition to the orientation and placement of the reservoir, the reservoir may have a volume that further allows the reservoir to be filled with the lubricating fluid (e.g., lubricating oil) during assembly of the FDB motor, such as the FDB motor 100 of FIG. 2B, in which the end cap 198 has yet to be coupled to the FDB motor 100. The volume of the reservoir may range from greater than the volume of the lubricating fluid used for the FDB motor to a volume substantially equal to the volume of lubricating fluid used for the FDB motor. Even though the reservoir may be filled with a predetermined amount (e.g., moles or mass) of lubricating fluid, the volume of the lubricating fluid used in the FDB motor may change (e.g., $\Delta V$). For example, the volume of the lubricating fluid may be different at different temperatures:

$$\Delta V = V_f - V_i,$$

wherein $V_f$ is a final volume and $V_i$ is an initial volume, and wherein the final volume is at a warmer temperature than the initial volume. The volume of the reservoir may be configured to take such a volume change into account, for example, due to a temperature change during assembly of the FDB motor or subsequent thereto, normal operation of the FDB motor, or non-operation of the FDB motor.

FIG. 3 is a plan view of a data storage device in which the FDB motor described herein may be used. A disk drive 300 generally includes a base plate 302 and a cover 304 that may be disposed on the base plate 302 to define an enclosed housing for various disk drive components. The disk drive 300 includes one or more data storage disks 306 of magnetic recording media. Typically, both of the major surfaces of each data storage disk 306 include a plurality of concentrically disposed tracks for data storage purposes. Each data storage disk 306 is mounted on a hub 308 (e.g., hub 154 of the FDB motor 100 of FIGS. 1A and 1B), which, in turn, is rotatably interconnected with the base plate 302 and/or cover 304. Multiple data storage disks 306 are typically mounted in vertically spaced and parallel relation on the hub 308. A spindle motor 310 (e.g., the FDB motor 100 of FIGS. 1A and 1B) rotates the data storage disks 306.

The disk drive 300 also includes an actuator arm assembly 312 that pivots about a pivot bearing 314, which, in turn, is rotatably supported by the base plate 302 and/or cover 304. The actuator arm assembly 312 includes one or more individual rigid actuator arms 316 that extend out from near the pivot bearing 314. Multiple actuator arms 316 are typically disposed in vertically spaced relation, with one actuator arm 316 being provided for each major data storage surface of each data storage disk 306 of the disk drive 300. Other types of actuator arm assembly configurations could be utilized as well, an example being an "E" block having one or more rigid actuator arm tips, or the like, that cantilever from a common structure. Movement of the actuator arm assembly 312 is provided by an actuator arm drive assembly, such as a voice coil motor 318 or the like. The voice coil motor 318 is a magnetic assembly that controls the operation of the actuator arm assembly 312 under the direction of control electronics 320.

The control electronics 320 may include a plurality of integrated circuits 322 coupled to a printed circuit board 324. The control electronics 320 may be coupled to the voice coil motor assembly 318, a slider 326, or the spindle motor 310 using interconnects that can include pins, cables, or wires (not shown).

A load beam or suspension 328 is attached to the free end of each actuator arm 316 and cantilevers therefrom. Typically, the suspension 328 is biased generally toward its corresponding data storage disk 306 by a spring-like force. The slider 326 is disposed at or near the free end of each suspension 328. What is commonly referred to as the read-write head (e.g., transducer) is appropriately mounted as a head unit (not shown) under the slider 326 and is used in disk drive read/write operations. The head unit under the slider 326 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 326 is connected to a preamplifier 330, which is interconnected with the control electronics 320 of the disk drive 300 by a flex cable 332 that is typically mounted on the actuator arm assembly 312. Signals are exchanged between the head unit and its corresponding data storage disk 306 for disk drive read-write operations. In this regard, the voice coil motor 318 is utilized to pivot the actuator arm assembly 312 to simultaneously move the slider 326 along a path 334 and across the corresponding data storage disk 306 to position the head unit at the appropriate position on the data storage disk 306 for disk drive read/write operations.

In accordance with some disk drive designs, when the disk drive 300 is not in operation, the actuator arm assembly 312 may be pivoted to a "parked position" to dispose each slider 326 generally at or beyond a perimeter of its corresponding data storage disk 306, but in any case in vertically spaced relation to its corresponding data storage disk 306. In this regard, the disk drive 300 includes a ramp assembly (not shown) that is disposed beyond a perimeter of the data storage disk 306 to both move the corresponding slider 326 vertically away from its corresponding data storage disk 306 and to also exert somewhat of a retaining force on the actuator arm assembly 312.

Exposed contacts 336 of a drive connector 338 along a side end of the disk drive 300 may be used to provide connectivity between circuitry of the disk drive 300 and a next level of integration such as an interposer, a circuit board, a cable connector, or an electronic assembly. The drive connector 338 may include jumpers (not shown) or switches (not shown) that may be used to configure the disk drive 300 for user specific features or configurations. The jumpers or switches may be recessed and exposed from within the drive connector 338.

As such, provided herein is an apparatus, comprising a stationary component; a rotatable component, wherein the stationary component and the rotatable component are positioned for relative rotation; a pump seal positioned in a radial channel at a first axial end of the rotatable component; a capillary seal positioned in an axial channel at a second axial end of rotatable component; and a fluid reservoir adjacent to the pump seal, wherein the fluid reservoir is positioned radially outward from the pump seal, and wherein the fluid reservoir extends radially outward from the pump seal. In some embodiments, the apparatus further comprises a fluid circuit positioned between the stationary component and the rotatable component, wherein the fluid circuit is configured to transport fluid between the first axial end of the rotatable component and the second axial end of the rotatable component, and wherein the fluid reservoir has a volume at least substantially equal to the volume of the lubricating fluid for the apparatus. In some embodiments, the apparatus further comprises a recirculation channel positioned in the fluid circuit, wherein the recirculation channel is further positioned in one of the stationary component or the rotatable component. In some embodiments, each of the pump seal and the capillary seal is positioned radially outward from the fluid circuit. In some embodiments, the pump seal and the capillary seal are in equilibrium during relative rotation.

Also provided herein is an apparatus, comprising a fluid circuit positioned between a stationary component and a rotatable component, wherein the stationary component and the rotatable component are positioned for relative rotation; a pump seal positioned in a radial channel at a first axial end of the rotatable component; a capillary seal positioned in an axial channel at a second axial end of rotatable component; and a fluid reservoir positioned radially outward from the pump seal, wherein the fluid reservoir extends radially outward from the pump seal. In some embodiments, the apparatus further comprises a recirculation channel positioned in the fluid circuit, wherein the recirculation channel is further positioned in one of the stationary component or the rotatable component. In some embodiments, the recirculation channel extends from the radial channel at the first axial end of the rotatable component to a radial channel at the second axial end of the rotatable component, and the radial channel at the second axial end of the apparatus is fluidly connected to the axial channel at the second axial end of the rotatable component. In some embodiments, each of the pump seal and the capillary seal is positioned radially outward from the fluid circuit. In some embodiments, the pump seal and the capillary seal are in equilibrium during relative rotation. In some embodiments, the apparatus further comprises one or more fluid dynamic bearings positioned in the fluid circuit, wherein the one or more fluid dynamic bearings are selected from journal bearings and thrust bearings.

Also provided herein is an apparatus, comprising a stationary component; a rotatable component, wherein the stationary component and the rotatable component are positioned for relative rotation; a first sealing means positioned in a radial channel at a first axial end of the rotatable component; a second sealing means positioned in an axial channel at a second axial end of the rotatable component; and a fluid reservoir adjacent to the first sealing means and extending radially outward from the first sealing means, wherein the fluid reservoir is positioned radially outward from the pump seal, and wherein the fluid reservoir extends radially outward from the pump seal. In some embodiments, the apparatus further comprises a fluid circuit positioned between the stationary component and the rotatable component, wherein the fluid circuit is configured to transport fluid between the first axial end of the rotatable component and the second axial end of the rotatable component, and wherein the fluid reservoir has a volume at least substantially equal to the volume of the lubricating fluid for the apparatus. In some embodiments, the apparatus further comprises one or more fluid dynamic bearings positioned in the fluid circuit. In some embodiments, the apparatus further comprises a recirculation channel positioned in the fluid circuit, wherein the recirculation channel is further positioned in one of the stationary component or the rotatable component. In some embodiments, the recirculation channel extends from the radial channel at the first axial end of the rotatable component to a radial channel at the second axial end of the rotatable component, and the radial channel at the second axial end of the apparatus is fluidly connected to the axial channel at the second axial end of the rotatable component. In some embodiments, each of the first sealing means and the second sealing means is positioned radially outward from the fluid circuit. In some embodiments, the first sealing means and the second sealing means are in equilibrium during relative rotation. In some embodiments, the first sealing means comprises a pump seal, and the second sealing means comprises a capillary seal. In some embodiments, the first sealing means comprises a capillary seal, and the second sealing means comprises a pump seal.

While some embodiments have been described and/or illustrated herein, and while these particular embodiments have been described and/or illustrated in considerable detail, it is not the intention of the applicant(s) for these particular embodiments to be limiting. Additional adaptations and/or modifications may readily appear to persons having ordinary skill in the art, and, in broader aspects, these adaptations and/or modifications may be also encompassed. Accordingly, departures may be made from the foregoing embodiments without departing from the scope of the concepts presented herein, which scope is limited only by the following claims when appropriately construed.

What is claimed is:

1. An apparatus, comprising
a stationary component including a shaft;
a rotatable component,
    wherein the stationary component and the rotatable component are positioned for relative rotation;
a grooved seal positioned in a radial channel and a meniscus positioned in the radial channel at a first axial end of the rotatable component, wherein
    the first axial end includes an upper journal bearing, and
    the radial channel includes a radially diverging gap section;
an axially diverging gap section radially outside of the radially diverging gap section;
a capillary seal positioned in an axial channel at a second axial end of rotatable component, wherein the second axial end includes a lower journal bearing; and
a fluid reservoir adjacent to the grooved seal,
    wherein the fluid reservoir is positioned radially outward from the grooved seal, and
    wherein the fluid reservoir extends radially outward from the grooved seal.

2. The apparatus of claim 1, further comprising
a fluid circuit positioned between the stationary component and the rotatable component,
    wherein the fluid circuit connects the first axial end of the rotatable component and the second axial end of the rotatable component, and
    wherein the fluid reservoir has a volume at least substantially equal to the volume of the lubricating fluid for the apparatus.

3. The apparatus of claim 2, further comprising
a recirculation channel positioned in the fluid circuit,
    wherein the recirculation channel is further positioned in one of the stationary component or the rotatable component.

4. The apparatus of claim 2, wherein each of the grooved seal and the capillary seal is positioned radially outward from the fluid circuit.

5. The apparatus of claim 1, wherein the grooved seal and the capillary seal are in equilibrium during relative rotation.

6. An apparatus, comprising
a fluid circuit positioned between a stationary component and a rotatable component,
    wherein the stationary component and the rotatable component are positioned for relative rotation, and
    wherein the stationary component includes a shaft;
a grooved seal positioned in a radial channel and a meniscus positioned in the radial channel at a first axial end of the rotatable component;
a first radially extending gap portion fluidly connected to the radial channel and radially outside of radial channel;
a second radially extending gap portion fluidly connected to the first radially extending gap portion, wherein a portion of the second radially extending gap portion overlaps with a portion of the first radially extending gap portion, and
the second radially extending gap portion diverges at a greater rate than the first radially extending gap portion;
a capillary seal positioned in an axial channel at a second axial end of rotatable component; and
a fluid reservoir positioned radially outward from the grooved seal,
    wherein the fluid reservoir extends radially outward from the grooved seal.

7. The apparatus of claim 6, further comprising
a recirculation channel positioned in the fluid circuit,
    wherein the recirculation channel is further positioned in one of the stationary component or the rotatable component.

8. The apparatus of claim 7, wherein the recirculation channel extends from the radial channel at the first axial end of the rotatable component to a radial channel at the second axial end of the rotatable component, and wherein the radial channel at the second axial end of the apparatus is fluidly connected to the axial channel at the second axial end of the rotatable component.

9. The apparatus of claim 6, wherein each of the grooved seal and the capillary seal is positioned radially outward from the fluid circuit.

10. The apparatus of claim 6, wherein the grooved seal and the capillary seal are in equilibrium during relative rotation.

11. The apparatus of claim 6, further comprising one or more fluid dynamic bearings positioned in the fluid circuit, wherein the one or more fluid dynamic bearings are selected from journal bearings and thrust bearings.

12. An apparatus, comprising
a stationary component including a shaft;
a rotatable component,
    wherein the stationary component and the rotatable component are positioned for relative rotation;
a first sealing means positioned in a radial channel and a meniscus positioned in the radial channel at a first axial end of the rotatable component;
a second sealing means positioned in an axial channel at a second axial end of the rotatable component, wherein the second sealing means includes a capillary seal;
an axially extending bearing entirely between the first sealing means and the second sealing means; and
a fluid reservoir adjacent to the first sealing means, wherein the fluid reservoir includes
    a chamfer section radially diverging from the first sealing means, a first diverging gap section axially diverging from the chamfer section, and a second diverging gap section overlapping the chamfer section and the first diverging gap section, wherein the second diverging gap section diverges at a greater rate than the first diverging gap section.

13. The apparatus of claim 12, further comprising a fluid circuit positioned between the stationary component and the rotatable component, wherein the fluid connects the first axial end of the rotatable component and the second axial end of the rotatable component, and wherein the fluid reservoir has a volume at least substantially equal to the volume of the lubricating fluid for the apparatus.

14. The apparatus of claim 13, further comprising one or more fluid dynamic bearings positioned in the fluid circuit.

15. The apparatus of claim 13, further comprising a recirculation channel positioned in the fluid circuit, wherein the recirculation channel is further positioned in one of the stationary component or the rotatable component.

16. The apparatus of claim 15, wherein the recirculation channel extends from the radial channel at the first axial end of the rotatable component to a radial channel at the second axial end of the rotatable component, and wherein the radial channel at the second axial end of the apparatus is fluidly connected to the axial channel at the second axial end of the rotatable component.

17. The apparatus of claim 13, wherein each of the first sealing means and the second sealing means is positioned radially outward from the fluid circuit.

18. The apparatus of claim 13, wherein the first sealing means and the second sealing means are in equilibrium during relative rotation.

19. The apparatus of claim 13, wherein the first sealing means comprises a grooved seal.

20. The apparatus of claim 13, wherein the first sealing means comprises a capillary seal, and wherein the second sealing means comprises a grooved seal.

* * * * *